(12) United States Patent
Mauroux et al.

(10) Patent No.: US 8,081,464 B2
(45) Date of Patent: Dec. 20, 2011

(54) HIGH-VOLTAGE SWITCH WITH COOLING

(75) Inventors: Jean-Claude Mauroux, Hunzenschwil (CH); Guenter Steding, Lottstetten (DE); Martin Lakner, Gebenstorf (CH); Bruno Widmer, Jona (CH)

(73) Assignee: ABB Technology AG, Zurich (CH)

( * ) Notice: Subject to any disclaimer, the term of this patent is extended or adjusted under 35 U.S.C. 154(b) by 18 days.

(21) Appl. No.: 12/543,879

(22) Filed: Aug. 19, 2009

(65) Prior Publication Data
US 2010/0044346 A1 Feb. 25, 2010

(30) Foreign Application Priority Data
Aug. 20, 2008 (EP) .................................. 08162664

(51) Int. Cl.
*H05K 7/20* (2006.01)
(52) U.S. Cl. ........ 361/703; 361/611; 361/647; 361/676; 361/690; 361/704; 218/118; 219/538; 174/15.1
(58) Field of Classification Search ................. 361/676, 361/688, 689, 690, 704, 707, 709, 710, 611, 361/631, 637, 647, 673, 692, 697, 702
See application file for complete search history.

(56) References Cited

U.S. PATENT DOCUMENTS

| | | | | |
|---|---|---|---|---|
| 3,609,206 A * | 9/1971 | McConnell | ................... | 174/15.6 |
| 3,769,551 A | 10/1973 | Corman et al. | | |
| 4,005,297 A | 1/1977 | Cleaveland | | |
| 4,650,939 A * | 3/1987 | Milianowicz | ................... | 218/118 |
| 6,762,389 B1 * | 7/2004 | Crooks et al. | ................... | 218/157 |
| 7,272,003 B2 * | 9/2007 | Pleines et al. | ................... | 361/690 |
| 7,733,654 B2 * | 6/2010 | Wang et al. | ................... | 361/710 |
| 7,852,617 B2 * | 12/2010 | Lee | ................... | 361/676 |
| 2005/0007742 A1 | 1/2005 | Pleines et al. | | |
| 2006/0102618 A1 * | 5/2006 | Lakner et al. | ................... | 219/538 |
| 2007/0209790 A1 | 9/2007 | Kiefer et al. | | |
| 2010/0282713 A1 * | 11/2010 | Tu et al. | ................... | 218/118 |

FOREIGN PATENT DOCUMENTS

| EP | 1 657 731 A1 | 5/2006 |
|---|---|---|
| EP | 1 496 534 B1 | 8/2006 |

OTHER PUBLICATIONS

European Search Report for EP 08162664.0 dated Mar. 6, 2009.

* cited by examiner

*Primary Examiner* — Courtney Smith
(74) *Attorney, Agent, or Firm* — Buchanan Ingersoll & Rooney PC

(57) ABSTRACT

An exemplary encapsulated high-voltage switch is disclosed which contains a heat-generating current conductor, a metal encapsulation surrounding the current conductor, and a cooling element. A cooler of the cooling element is fixed on a part of the encapsulation that is embodied as a mounting plate, and has cooling ribs arranged outside the encapsulation. In a section of the cooler that is embodied as a cooling block, at least a portion of the cooling ribs is arranged parallel to the mounting plate and is held on a heat distributor fixed to the mounting plate in such a way that on both sides of the heat distributor in each case one of two groups of cooling channels arises, in which the cooling channels are in each case arranged in the manner of a sandwich. The cooling channels can, for example, be oriented in a manner inclined relative to a horizontal axis of the switch.

14 Claims, 3 Drawing Sheets

PRIOR ART

HIGH-VOLTAGE SWITCH WITH COOLING

RELATED APPLICATION

This application claims priority under 35 U.S.C. §119 to European Patent Application No. 08162664.0 filed in Europe on Aug. 20, 2008, the entire content of which is hereby incorporated by reference in its entirety.

FIELD

The disclosure concerns the field of high-voltage technology and relates to a high-voltage switch.

BACKGROUND INFORMATION

Switches embodied as a circuit-breaker, load-break switch or disconnecting switch are known which have one or a plurality of current conductors of a polyphase alternating current, a metal encapsulation accommodating the current conductor or the current conductors, and at least one cooling element by which heat generated during the operation of the switch in a high-voltage installation on account of current losses in the current conductor or in the current conductors is removed from the encapsulation. If the switch is intended for an installation loaded with high currents, for instance an outgoing generator line, then at rated high voltages on the order of between approximately 1 and 70 kV it can carry rated currents that lie, for example, between 6 kA and 40 kA. If it is used in a gas-insulated encapsulated switchgear installation of a high-voltage system, then at rated voltages on the order of between approximately 70 and 800 kV it can carry rated currents of, for example, 2 to 6 kA.

At rated currents, the current conductor (e.g., tubular in shape) can experience a high degree of heating on account of resistive losses. The current conductor encompasses the rated current path of the high-voltage switch since greater current losses and therefore also greater formation of heat than in the material of the current conductor can occur there on account of contact locations. During rated current operation, a maximum temperature prescribed by standards, for example 105° C., and thus a resultant maximum temperature increase, for example 65° C., should not be exceeded, whereby the maximum rated current of the switch is limited. In order to keep the operating temperature of the current conductor below the permissible maximum temperature, therefore, the heat loss can be removed from the installation by cooling the current conductor.

A high-voltage switch which is embodied as a switch pole of a three-pole generator switch is described in EP 1 496 534 B1 and EP 1 657 731 A1. This switch has a phase conductor which is arranged in a metal encapsulation and which is heated during operation of the switch in an outgoing generator line on account of resistive current losses. Therefore, the high-voltage switch contains a cooling element with a cooler held on the metal encapsulation. The cooler is fixed on a part of the encapsulation that is embodied as a mounting plate, and has cooling ribs arranged outside the encapsulation. The heat formed in the phase conductor is fed to the cooler by air present in the encapsulation (EP 1 496 534 B1) or by the vapor of a liquid evaporated at the phase conductor (EP 1 657 731 A1). The heat emitted by the cooling of the air or respectively by condensation of the vapor is absorbed by the cooler and emitted to the ambient air via the cooling ribs in an effort to increase current carrying capacity without significantly increasing overall dimensions.

SUMMARY

An encapsulated switch is disclosed, comprising: a heat-generating current conductor; a metal encapsulation surrounding the current conductor; and a cooling element with a cooler which is fixed on a part of the encapsulation that is embodied as a mounting plate, and which has cooling ribs arranged outside the encapsulation, a section of the cooler being embodied as a cooling block, at least a portion of the cooling ribs being arranged parallel to the mounting plate and being held on a heat distributor fixed to the mounting plate such that each side of the heat distributor includes one of two groups of cooling channels, each group of cooling channels being arranged as a sandwich.

BRIEF DESCRIPTION OF THE DRAWINGS

An exemplary embodiment of the disclosure is explained in more detail below with reference to drawings, in which.

Figure 1:
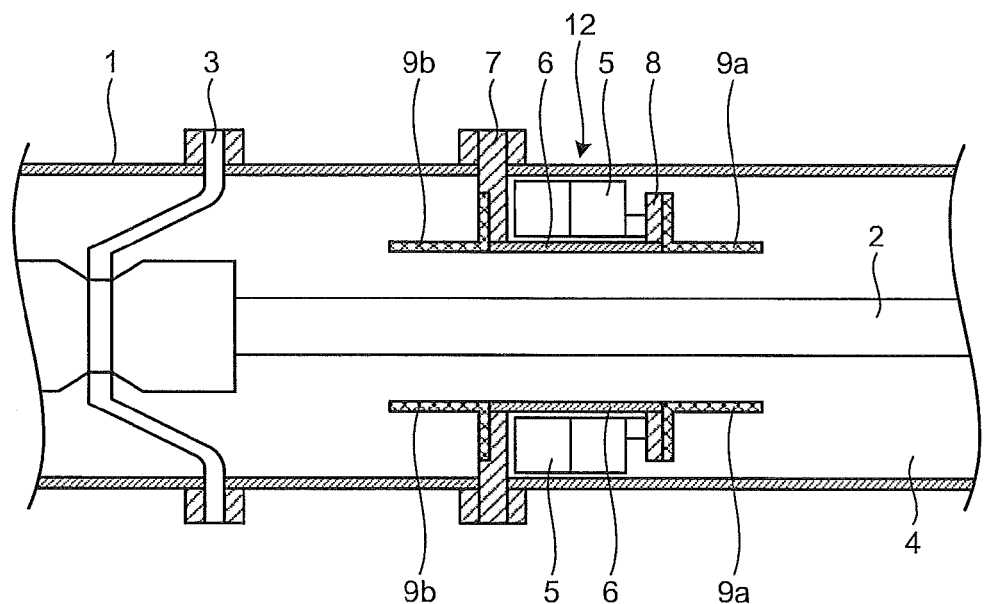
FIG. 1 shows a plan view of a section through a schematically illustrated exemplary embodiment of a high-voltage switch according to the disclosure that is embodied as a switch pole of a three-pole generator switch.

The reference symbols used in the drawings and their meaning are summarized in the List of reference symbols. In principle, identical or identically acting parts are provided with identical reference symbols in the figures. Parts that are not essential for understanding the disclosure are not illustrated in some instances. The exemplary embodiment described is a representative example of the subject matter of the disclosure and has no limiting affect.

DETAILED DESCRIPTION

A high-voltage switch is disclosed which can provide an increased rated current-carrying capacity with a relatively simple construction, and with dimensions of a metal encapsulation that are maintained unchanged relative to known high voltage switches. As referenced herein, a high voltage switch is a switch which operates at a rated voltage on the order of between approximately 1 and 800 kV, although applications of the switch outside this range are also contemplated.

In an exemplary high-voltage switch according to the disclosure, in a section of the cooler that is embodied as a cooling block with cooling ribs, at least a portion of the cooling ribs is arranged parallel to a mounting plate of the metal encapsulation and is held on a heat distributor fixed to the mounting plate in such a way that on both sides of the heat distributor, in each case, one of two groups of cooling channels is provided with the cooling channels in each case being arranged in the manner of a sandwich and oriented in a manner inclined relative to a horizontal axis of the switch.

Exemplary embodiments as disclosed herein can increase the efficiency of the cooler since a chimney effect is achieved owing to the cooling channel arrangement inclined with respect to the horizontal. In this case, heated air flowing out at the upper end of the cooling channels can be continuously replaced by cool ambient air that is sucked in at the lower end of the cooling channels and in the process absorbs heat from the cooling ribs. Since this cooling process is primarily determined by thermal parameters of the installation, such as the difference between the temperature of the cooling ribs and the temperature of the external air, this process is virtually independent of external disturbing influences that are difficult to take into account, such as the wind and insolation. Consequently, a well-developed cooling air flow through the cooler is achieved even when the wind is weak or when there is a high degree of insolation. Therefore, more heat is dissipated in the case of the high-voltage switch according to the disclosure than in the case of known high-voltage switches with a cooler in which the cooling ribs are arranged directly on the outer side of the metal encapsulation and form a right angle with the outer side of the metal encapsulation.

Owing to an exemplary sandwich design as disclosed herein, the cooling ribs are not directly exposed to the influence of the surroundings and therefore become soiled to a significantly lesser extent than the cooling ribs in the case of known high-voltage switches. Exemplary sandwich designs as disclosed herein can result in a cooler which is embodied in very compact fashion and which, for the same volume, has a larger surface area and thus also a higher efficiency than a cooler incorporated in known switches. Effects of an exemplary switch according to the disclosure can be particularly advantageous if a heat pipe is used as a cooling element, since a failure of the heat pipe owing to the excessively low capacity of its cooler on account of unfavorable ambient influences such as, for instance, too little wind or an excessively high degree of insolation can then be avoided.

If, in the case of an exemplary switch according to the disclosure, the heat distributor is embodied as a plate and is fixed to the mounting plate by an edge projecting from the cooling ribs, then the heat generated in the current conductor can be distributed uniformly in the assigned cooling block. Since there is enough space available to the plate radially with respect to the metal encapsulation, a large amount of heat can be emitted to the ambient air and a larger rated current can thus be carried.

If, for example, a fixing element that is led through the mounting plate is formed into the edge, for example by chip-removing machining, such as milling, in particular, then the cooling block can be fixed to the mounting plate during the production of the cooler in a favorable manner in terms of production engineering, preferably by welding.

The heat formed in the current conductor can pass to the cooler from the current conductor by, for example, radiation, convection of an insulating gas, such as air, in particular, in the metal encapsulation, forced circulation of the insulating gas in the metal encapsulation or by condensation of the vapor of a liquid that is evaporated at the current conductor. If the heat passes to the cooler by condensation of the vapor of a liquid that is evaporated at the current conductor, for example by means of a heat pipe, then the heat distributor can be configured to include a cavity for the condensation of the vapor that transports the heat from the metal encapsulation into the cooler. For production engineering reasons a hollow lug that is led through the mounting plate and rigidly connected to the mounting plate can be formed into the edge, the lug connecting the cavity to an evaporator of the cooling element, the evaporator being arranged in the interior of the encapsulation. Firstly, the heat distributor and thus the assigned cooling block with the lug can then be fitted into an opening in the mounting plate and be attached to the mounting plate in a vacuum-tight manner by welding, for instance. Secondly, however, a vacuum-tight connection for the vapor and the liquid between the cavity of the heat distributor and the evaporator can then also be achieved at the same time.

In an exemplary method for producing a cooling block which is suitable for mass production and therefore particularly cost-effective, the heat distributor and the portion of the cooling ribs fixed to the heat distributor should be embodied as an extruded hollow profile. The cooling block can then be produced from the hollow profile in a particularly simple manner if said cooling block has a section of the profile that is cut to length and welded in a vacuum-tight manner to closure plates at the ends.

In order to achieve a particularly effective cooling capacity, advantageously at least two cooling blocks embodied substantially identically are fixed to the mounting plate, and a hollow collecting channel is held on that side of the mounting plate which faces away from the cooling blocks, the collecting channel being connected in a vacuum-tight manner to the evaporator and to the cavity of each of the two cooling blocks.

In order to ensure reliable operation of the cooler and thus of the high-voltage switch according to the disclosure, an exemplary collecting channel can include a tube connector connected in a vacuum-tight manner to the evaporator, and also at least one connecting piece embodied in hollow fashion and serving for the vacuum-tight connection of an auxiliary device, for example a service apparatus and/or a filter.

By virtue of the fact that a connecting channel which converts cavities of the heat distributors to one another is arranged outside the encapsulation and is fitted to those ends of one of the cooling blocks which face away from the collecting channel, the circulation of vapor and liquid in the cooler is facilitated and the cooling capacity of the cooler is thus increased. Therefore, in this way heat can be additionally dissipated from the metal encapsulation and exemplary high-voltage switches according to the disclosure can accordingly be loaded with an even higher rated current.

An exemplary switch pole is illustrated in FIG. 1 with a tubular current conductor 10 enclosed by an air-filled metal encapsulation 20, such as a metal based on aluminum (e.g., an aluminum alloy).

During operation in an outgoing generator line, high voltage of for example 10 to 40 kV is present between the current-conducting encapsulation 20, which is held at a defined potential, for example ground potential, and the current conductor 10 and the current conductor carries an operating current of, for example, 6 to 40 kA. Owing to resistive losses in the material of the current conductor 10 and at contact locations of the switch pole, such as rated current contacts, the current conductor 10 can heat up to more than 100° C.

In order to dissipate the heat loss, the current conductor 10 is cooled by cooling means configured, for example, as two cooling elements 30, 30', of which the cooling element 30 illustrated to the left of the separating line T is embodied as a heat pipe and the cooling element 30' illustrated to the right of the separating line utilizes the thermal—identified by an arrow L—of the air heated in the metal encapsulation for the purpose of heat transfer. Each cooling element 30, 30' can contain a cooler K, K', which is held on the encapsulation 20 and which emits heat W to the ambient air. The cooling element 30 embodied as a heat pipe contains a liquid working medium which evaporates in its liquid phase in a section of the heat pipe that is designated as an evaporator 31, with absorption of the heat loss formed in the current conductor. The vapor formed is condensed in a section of the heat pipe that comprises the cooler K, with emission of heat of condensation. The heat pipe furthermore has a hollow insulator 32, which is used for electrical insulation between the evaporator 31 and the cooler K or respectively a flexible hose 33 connected to a cavity in the cooler to enable the working medium to be guided in the liquid and gaseous phases. The coolers K and K' are each arranged on a roof slope 21 of the metal encapsulation 20 and are each in thermal contact with the ambient air, such that efficient dissipation of the heat is possible.

An exemplary construction of the cooler K can be seen from FIGS. 2 to 5. It can be gathered from FIGS. 2 to 4 that the cooler K is fixed on a part of the encapsulation 20 that is embodied as a mounting plate 22. As can be seen, the mounting plate 22 has spacers 23, by means of which the plate and thus also the cooler K, in the region of the roof slope 21, are screwed to the metal encapsulation 20 in a substantially airtight manner, and also a border 24 projecting above the plate plane, the border additionally protecting the interior of the encapsulation.

As can be seen, the cooler K contains five cooling blocks 40 embodied substantially identically and fixed to the mounting plate 22 along side one another. Instead of five, of course, more or fewer cooling blocks 40 can also be provided. Each cooling block 40 has cooling ribs 41 arranged outside the encapsulation, which cooling ribs are arranged parallel to the mounting plate 22. The cooling ribs 41 are held on a heat distributor 42, which is embodied as a plate and extended at right angles to the cooling ribs 41. In this way, one of two groups of cooling channels 43 which are arranged in the manner of a sandwich and are oriented in a manner inclined relative to the horizontal respectively, arise on each side of the heat distributor 42. Since the mounting plate 22 is fixed to the roof slope 21 of the metal encapsulation 2, the angle of inclination of the cooling channels 43 is determined by the inclination of the roof slope 21. Each of the heat distributors 42 contains an edge 44 which projects from the cooling ribs 41 and which has the same angle of inclination as the cooling channels 43 and extends parallel to the roof slope 21 or respectively the cooling channels 43.

Figure 2:
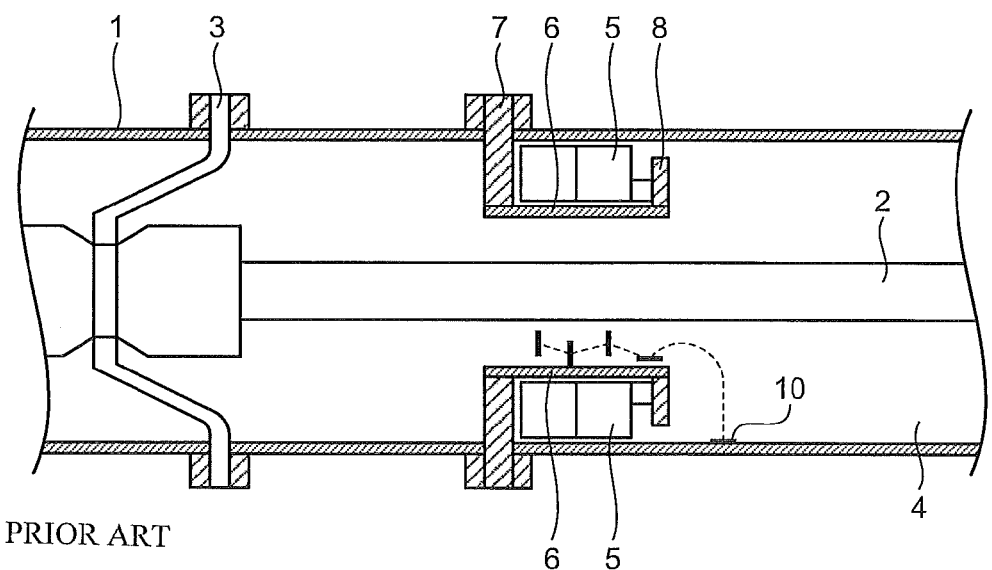
FIG. 2 shows in perspective illustration an exemplary cooler that is fixed on a mounting plate and is incorporated in the switch pole according to FIG. 1 to the left of the separating line T.
Figure 3:
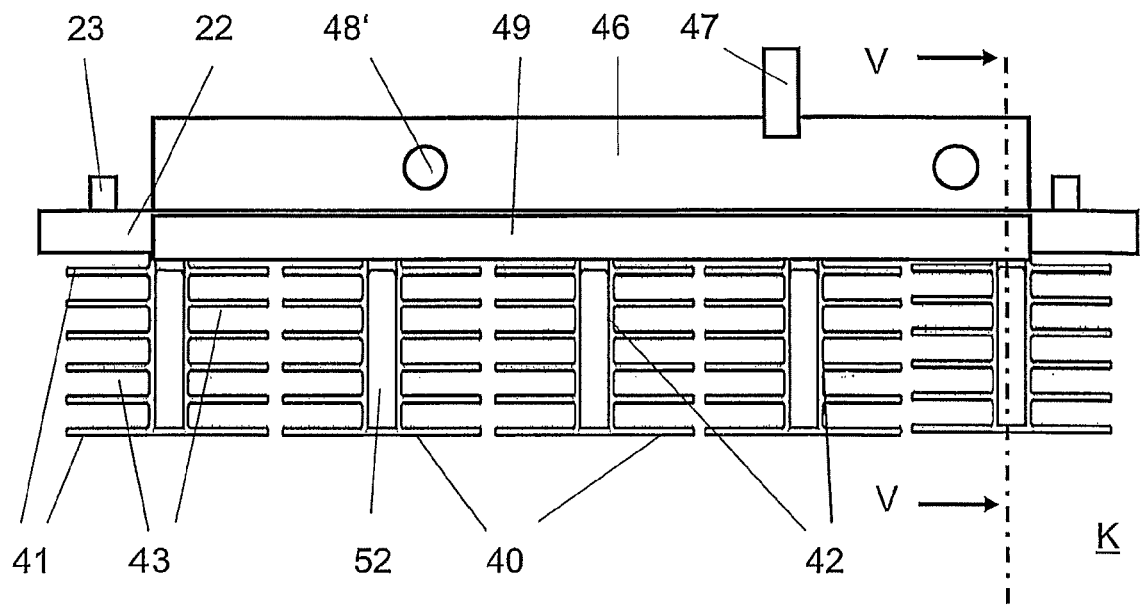
FIG. 3 shows a plan view of the cooler according to FIG. 2.
Figure 4:
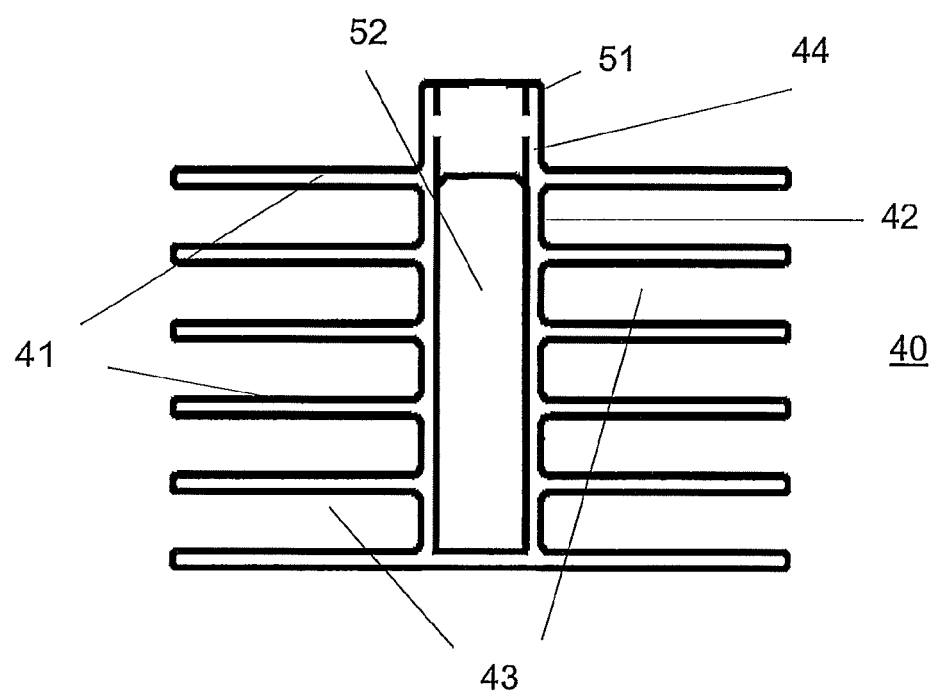
FIG. 4 shows in enlarged illustration a plan view of an exemplary cooling block contained in the cooler according to FIGS. 2 and 3.
Figure 5:
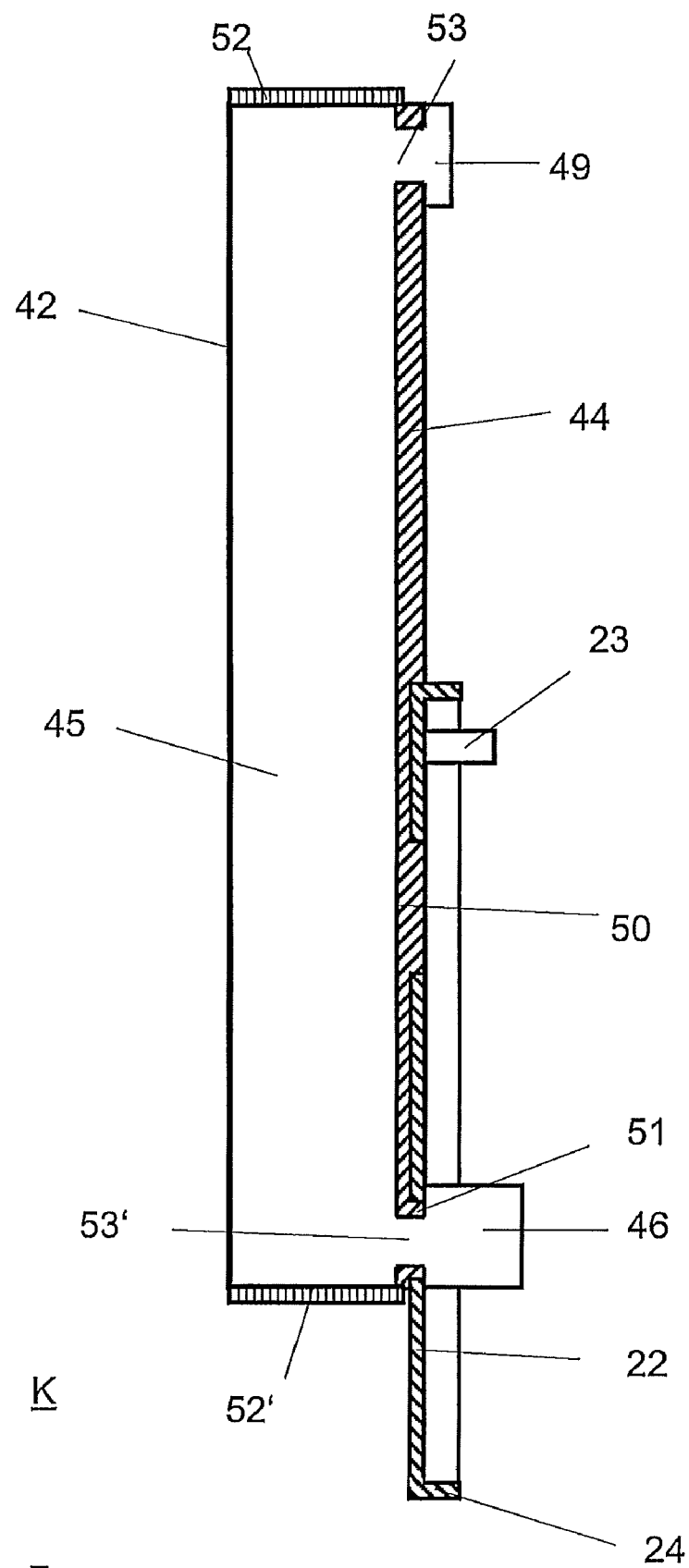
FIG. 5 shows a plan view—taken in the arrow direction—of a section taken along V-V through the exemplary cooler according to FIG. 3.

The heat distributors 42 can be embodied in hollow fashion and each can contain a cavity 45, such as that shown in FIG. 5. The cavities 45 of the five heat distributors 42 are connected to a predominantly horizontally extended collecting channel 46 at the lower ends of the heat distributors 42 or respectively the cooling blocks 40. As can be seen in FIG. 2, the collecting channel 46 has a tube connector 47 at its underside, the tube connector being connected to the flexible hose 33 that can be seen from FIG. 1. Connecting pieces 48, 48' in each case for the vacuum-tight connection of an auxiliary device are provided on the top side of the collecting channel 46. By way of example, a service device used for the supply, monitoring and maintenance of the cooling element 30 can be connected to the connecting piece 48, by means of which service device the collecting channel 46 and the cavities communicating therewith in the cooling blocks 40, the flexible hose 33, the insulator 32 and the evaporator 31 can be evacuated and working medium can be filled into the cooling element 30 or be removed from the cooling element 30. By way of example, a filter used for keeping the working medium clean can be inserted into the connecting piece 48'. The cavities 45 are connected to a predominantly horizontally extended connecting channel 49 at the upper ends of the heat distributors 42 or respectively the cooling blocks 40.

It can be gathered from FIG. 5 that a fixing element 50 that is led through the mounting plate 22 and rigidly connected to the mounting plate, and also a hollow lug 51 that is likewise led through the mounting plate and rigidly connected to the mounting plate can be formed into the edge 44. The lug 51 connects the cavity 45 to the collecting channel 46 and thus also to the evaporator 31 of the cooling element 30, the evaporator being arranged in the interior of the encapsulation 20.

During an exemplary production process of the cooler K, firstly an extruded hollow profile containing the heat distributor 42 and the cooling ribs 41 is cut to length. The fixing element 50 and the lug 51 are milled and passages 53, 53' connecting the collecting channel 46 and the connecting channel 49 to the cavity 45 are drilled into the edge 44 projecting beyond the cooling ribs 41. The cavity 45 in the profile prepared in this way is welded in a vacuum-tight manner to two closure plates 52, 52' at the ends, with a cooling block 40 being completed. The fixing element 50 and the hollow lug 51 are inserted through openings produced in an accurately fitting manner in the mounting plate 22 and the cooling block 40 is fixed to the mounting plate 22 by circumferential welding of the parts 50 and 51 inserted through. After all five cooling blocks 40 have been fixed, the collecting channel 46 is welded to the inner side of the mounting plate 22. Since the connecting path for the working medium from the evaporator 31 to the cavity 45 has to be vacuum-tight, the hollow lug 51 and the collecting channel 46 are welded to the mounting plate 22 in a vacuum-tight manner. The connecting channel 49 provided, if appropriate, is welded to the upper ends of the cooling blocks 40 in a vacuum-tight manner in the region of the passages 53. The mounting plate 22 carrying the cooler K is fixed to the roof slope 21 of the housing 20 with the aid of mounting screws that engage into the spacers 23.

Instead of a cooling element 30 embodied as a heat pipe, the cooling element 30' can also be incorporated into the switch according to the disclosure. In the case of this cooling element, however, the cooler K' is not embodied in hollow fashion, but rather has ribs R (can be seen from FIG. 1) which are led into the interior and which absorb the heat transported by convection and conduct it outward to the cooling ribs embodied and arranged in a manner corresponding to the cooler K.

During operation of an exemplary high-voltage switch according to the disclosure, the heat generated in the current conductor 10 is passed to the cooler K or respectively K' of the cooling element 30 or 30'. In the case of the cooling element 30, the working medium evaporated in the evaporator 31 is passed via the hollow insulator 32, the flexible hose 33 and the tube connector 47 into the collecting channel 46 and is distributed from there into the cavities in the heat distributors 42. The vapor condenses with emission of heat of condensation in the cavities in the cooler K. Owing to gravitational force, the condensate flows back to the evaporator 31 again. A particularly uniform distribution of the inflowing vapor in the individual cavities 45 and thus a particularly good cooling capacity can be achieved by means of the connecting channel 49. In the case of the cooling element 30', the heat passes to the cooler K' by thermal convection L of the heated air enclosed into the metal encapsulation 20.

By virtue of the fact that in both exemplary coolers K and K', the cooling ribs 41 are arranged parallel to the mounting plate 22 and thus also to the roof slope 21 of the metal encapsulation 20 and are held on a heat distributor 42 fixed to the mounting plate 22 in such a way that cooling channels 43 which are arranged in the manner of a sandwich and are oriented in a manner inclined relative to the horizontal respectively arise on both sides of the heat distributor, the efficiency of the cooler K or K' can be effectively increased. A chimney effect is then achieved in the cooling channels 43. In this case, heated air flowing out at the upper end of the cooling channels 43 is continuously replaced by cool ambient air that is sucked in at the lower end of the cooling channels 43 and in the process absorbs heat W from the cooling ribs 41. Since this cooling process is primarily determined by thermal parameters of the installation, such as the difference between the temperature of the cooling ribs and the temperature of the external air, this process is virtually independent of external disturbing influences that are difficult to take into account, such as the wind and insolation. Consequently, a well-developed cooling air flow through the cooler K or respectively K' can be achieved even when the wind is weak or when there is a high degree of insolation. Therefore, more heat is dissipated in the case of an exemplary high-voltage switch according to the disclosure than in the case of known high-voltage switches. Owing to the sandwich design, moreover, the cooling ribs are not directly exposed to the influence of the surroundings and therefore become soiled to a significantly lesser extent than the cooling ribs in the case of the known high-voltage switches. Moreover, the sandwich design results in a cooler which can be embodied in very compact fashion and which, for the same volume, can have a larger surface area and thus also a higher efficiency than a cooler incorporated in known switches.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

10 Current conductor
20 Metal encapsulation
21 Roof slope
22 Mounting plate
23 Spacers
24 Border
30, 30' Cooling elements
31 Evaporator
32 Insulator
33 Flexible hose
40 Cooling blocks
41 Cooling ribs
42 Heat distributor
43 Cooling channels
44 Edge
45 Cavity
46 Collecting channel
47 Tube connector
48, 48' Connecting pieces
49 Connecting channel
50 Fixing element
51 Hollow lug
52, 52' Closure plates
53 Passages
K, K' Coolers
L Thermal of the air enclosed in the metal encapsulation
R Ribs
T Separating line
W Heat emitted by the cooler

What is claimed is:

1. An encapsulated high-voltage switch, comprising:
  a heat-generating current conductor;
  a metal encapsulation surrounding the current conductor; and
  a cooling element with a cooler which is fixed on a part of the encapsulation that is embodied as a mounting plate, and which has cooling ribs arranged outside the encapsulation, a section of the cooler being embodied as a cooling block, at least a portion of the cooling ribs being arranged parallel to the mounting plate and being held on a heat distributor fixed to the mounting plate such that each side of the heat distributor includes one of two groups of cooling channels, wherein the cooling channels in each group of cooling channels are arranged as a sandwich, and wherein each group of cooling channels is inclined relative to a horizontal axis of the switch.

2. The switch as claimed in claim 1, configured as a high voltage switch, wherein the heat distributor is embodied as a plate and is fixed to the mounting plate by an edge projecting from the cooling ribs and wherein each group of cooling channels is inclined relative to a horizontal axis of the switch.

3. The switch as claimed in claim 2, comprising:
  a fixing element that is led through the mounting plate and rigidly connected to the mounting plate, and that is formed into the edge.

4. The switch as claimed in claim 3, wherein the heat distributor comprises:
  a cavity for condensation of vapor that transports heat from the encapsulation into the cooler.

5. The switch as claimed in claim 4, comprising:
  a hollow lug that is led through the mounting plate and rigidly connected to the mounting plate, and that is formed into the edge, said lug connecting the cavity to an evaporator of the cooling element, said evaporator being arranged in an interior of the encapsulation.

6. The switch as claimed in claim 5, wherein the heat distributor and the portion of the cooling ribs fixed to the heat distributor are produced in a shape of an extruded hollow profile.

7. The switch as claimed in claim 6, wherein the cooling block comprises:
  a section of the extruded hollow profile that is cut to length and welded in a vacuum-tight manner to closure plates at ends of the section.

8. The switch as claimed in claim 7, comprising:
  at least two cooling blocks embodied substantially identically, fixed to the mounting plate; and
  a hollow collecting channel held on a side of the mounting plate which faces away from the cooling blocks, said collecting channel being connected with a vacuum-tight connection to a cavity of each of the two cooling blocks and to the evaporator.

9. The switch as claimed in claim 8, wherein the collecting channel comprises:
  a tube connector connected in a vacuum-tight manner to the evaporator; and
  at least one connecting piece embodied in hollow fashion and serving for the vacuum-tight connection of an auxiliary device.

10. The switch as claimed in claim 9, comprising:
  a connecting channel arranged outside the encapsulation, fitted to ends of one of the cooling blocks which face away from the collecting channel, said connecting channel connecting cavities of heat distributors of the cooling ribs to one another.

11. The switch as claimed in claim 2, wherein the heat distributor comprises:
  a cavity for condensation of vapor that transports heat from the encapsulation into the cooler.

12. The switch as claimed in claim 11, wherein the heat distributor and the portion of the cooling ribs fixed to the heat distributor are produced in a shape of an extruded hollow profile.

13. The switch as claimed in claim 4, comprising:

at least two cooling blocks embodied substantially identically, fixed to the mounting plate; and a hollow collecting channel held on a side of the mounting plate which faces away from the cooling blocks, said collecting channel being connected with a vacuum-tight connection to a cavity of each of the two cooling blocks and to the evaporator.

14. The switch as claimed in claim 13, comprising:

a connecting channel arranged outside the encapsulation, fitted to ends of one of the cooling blocks which face away from the collecting channel, said connecting channel connecting cavities of heat distributors of the cooling ribs to one another.

* * * * *